United States Patent

[11] 3,589,560

[72] Inventor Fred A. Wilcox
 4719 W. 210th, Fairview Park, Ohio 44126
[21] Appl. No. 808,544
[22] Filed Mar. 19, 1969
[45] Patented June 29, 1971

[54] MATERIAL DISPENSING MECHANISM
 14 Claims, 10 Drawing Figs.
[52] U.S. Cl. .................................................. 222/31,
 222/246, 222/473, 222/559
[51] Int. Cl. .......................................... B67d 5/22
[50] Field of Search ........................................... 222/31,
 246, 323, 473, 559

[56] References Cited
 UNITED STATES PATENTS
2,861,721 11/1958 Race ............................ 222/246

Primary Examiner—David M. Bockenek
Attorney—Baldwin, Egan, Walling & Fetzer

ABSTRACT: A material dispensing device for use, for instance, as a multipurpose garden gun, comprising a storage section adapted for receiving a quantity of material therein, such as for instance fertilizers (either liquid or solid), weed killers, (either liquid or solid) lime or the like, with a dispensing tube communicating with and extending from the storage section, and with valve means coacting with the storage section and the dispensing tube for controlling the discharge of the material from the storage section into the tube. A pistol-grip-type handle is provided, with trigger means coupled to the valve means for selective and expeditious actuation of the valve means.

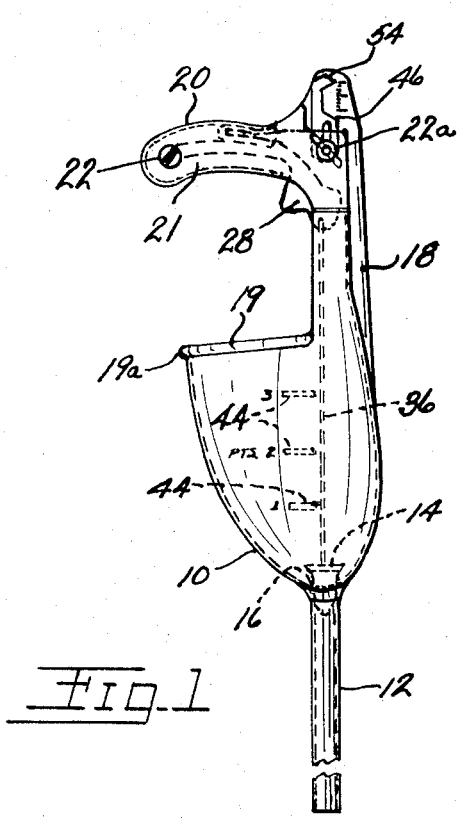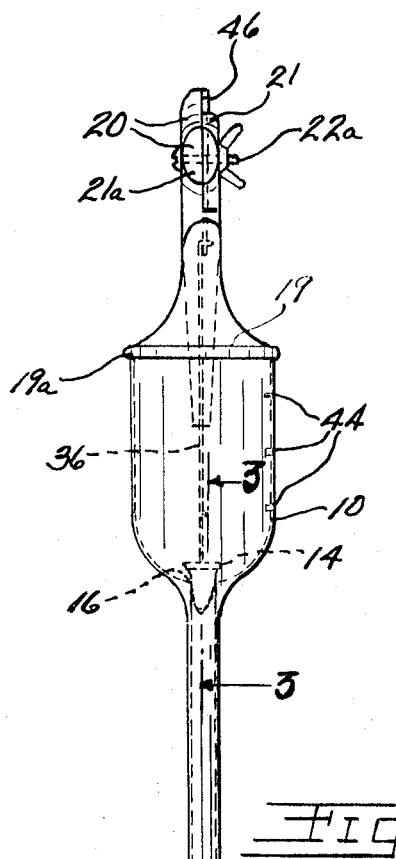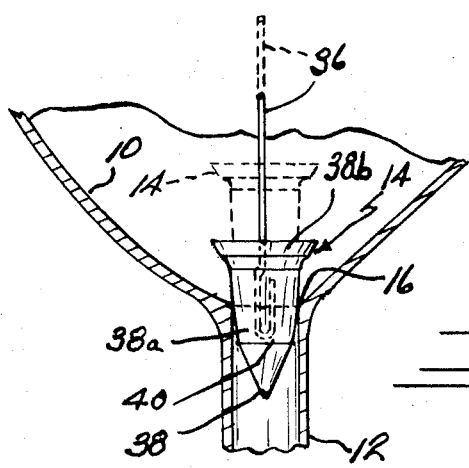

INVENTOR
FRED A. WILCOX
BY
Baldwin, Egan, Walling & Fetzer
ATTORNEYS

INVENTOR
FRED A. WILCOX

Baldwin, Egan, Walling & Fetzer
ATTORNEYS

MATERIAL DISPENSING MECHANISM

This invention relates in general to a material dispensing mechanism and more particularly to a material dispensing mechanism which may be used a a multipurpose garden tool or the like, for dispensing fertilizers and other materials, both liquid and solid.

BACKGROUND OF THE INVENTION

Material dispensing mechanisms in the form of garden devices and the like for dispensing fertilizers, weed killers or the like, are known in the art. An example of such prior art mechanism is U.S. Pat. No. 1,743,983 to Seltzer, dated Jan. 14, 1930. However, in most of these prior art mechanisms they either are unduly complex or else they do not operate properly so that the material can be dispensed can be expeditiously directed by means of the tool to a particular location as desired by the operator, or they do not permit the dispensing of controlled amounts of material ranging from g9anular to liquid.

SUMMARY OF THE INVENTION

The present invention provides a material dispensing mechanism which may be expeditiously utilized as a garden gun, and which holds a quantity of material to be dispersed by the mechanism, and wherein the flow of material from the mechanism can be readily and conveniently controlled so that the exact amount of material that is desired to be delivered by the dispensing mechanism is delivered and to a predetermined location.

Accordingly, an object of the invention is to provide a novel material dispensing mechanism. Another object to to the invention is to provide a novel material dispensing mechanism which is in the form of a multipurpose garden tool for dispensing both dry and liquid materials.

A still further object of the invention is to provide a mechanism of the above-described type which includes a novel valve means for expeditiously controlling the discharge of the material from the mechanism.

A still further object of the invention is to provide a mechanism of the above-discussed type which has a storage hopper for storing a quantity of the material to be dispensed, and wherein the valve means coacts with the storage hopper and is so constructed and arranged so as to agitate the material in the storage hopper during opening movement of the valve means, so that any of the material that has caked around the valve means is broken up.

Another object of the invention is to provide a mechanism of the aforediscussed type which includes means therein for selectively varying the extent of opening movement of the valve means and thus varying the quantity of material that can be discharged per unit time through the valve means.

A still further object of the invention is to provide a mechanism of the above-described type wherein discharge of the material from the mechanism is controlled by means of a squeezable trigger mechanism adapted to be operated by the hand of an operator, so that upon squeezing of the trigger, the valve means of the mechanism will be opened a preselected amount, and the valve means will automatically close without further effort on the part of the operator as soon as the trigger mechanism is released.

Other objects and advantage of the invention will be apparent from the following description taken in conjunction with the accompanying drawings:

BRIEF DESCRIPTION OF THE DRAWINGS

FIG. 1 is a partially broken side elevational view of a material discharge mechanism constructed in accordance with the invention;

FIG. 2 is an end elevational view of the FIG. 1 mechanism;

FIG. 3 is a fragmentary, sectional view generally taken along the plane of line 3–3 of FIG. 2 looking in the direction of the arrows and illustrating the valve means for controlling the flow of material from the distributing mechanism;

DESCRIPTION OF THE PREFERRED EMBODIMENTS

Figure 5:
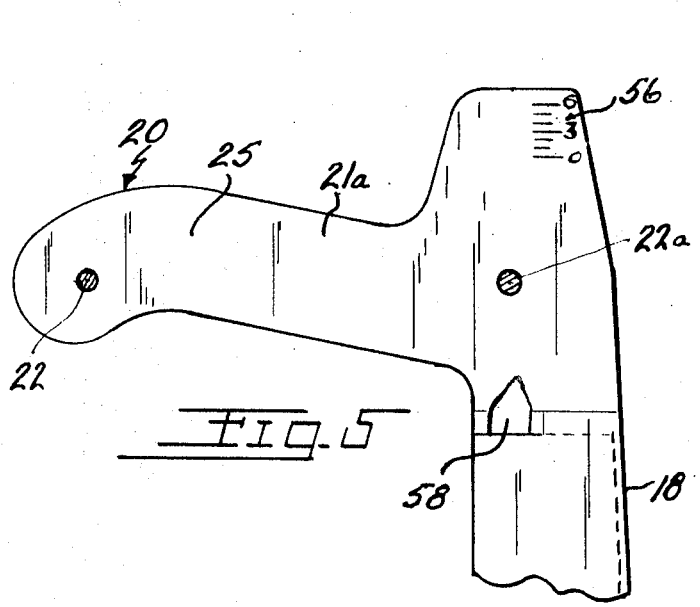
FIG. 5 is a fragmentary view of the handle portion of the distributing mechanism taken generally along the plane of line 514 5 of FIG. 4 looking in the direction of the arrows.

Referring now again to the drawings, there is illustrated a material dispensing mechanism in the form of a multipurpose garden tool. The mechanism in the embodiment illustrated comprises a hopper of storage section 10 which has a discharge tube or duct 12 communicating therewith, and with valve mechanism 14 being adapted to control the discharge of material disposed in the hopper or storage section 12 from the latter into the discharge duct 12.

Duct 12 is of elongated construction and is attached to the hopper or storage section 10 at opening 16 therein. Extending upwardly from the storage section 10 is a generally hollow or recessed neck portion 18 which in turn supports handle portion 20 which is of an elongated pistol grip type. Handle portion 20 projects generally horizontally rearwardly from neck portion 18 and overlies the storage section 10. Section 10 has widened mouth 19 for pouring material therein to be distributed, with the mouth preferably being reinforced by an exterior rim 19a.

Figure 4:
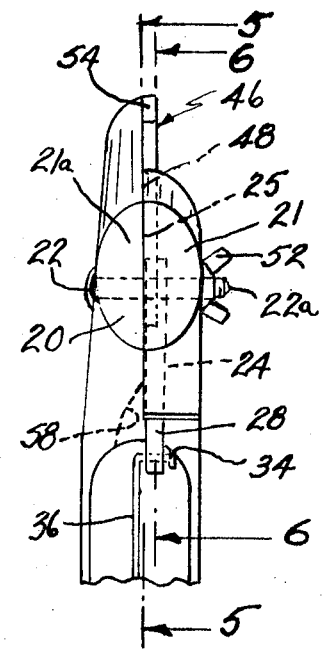
FIG. 4 is an enlarged, fragmentary, end elevational view of the handle portion of the mechanism showing the connection of the trigger to the valve actuating rod.
Figure 6:
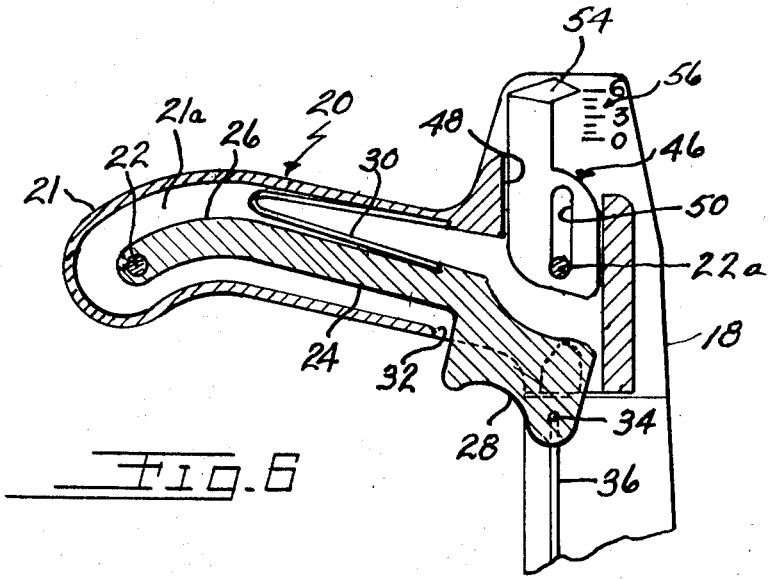
FIG. 6 is a fragmentary sectional view taken generally along the plane of line 6–6 of FIG. 4, looking in the direction of the arrows.

Handle portion 20 preferably includes removable hollow section 21 which is attached to the main section 21a of the handle as by fasteners 22, 22a (FIGS. 4 and 6). As best shown in FIG. 6, an elongated trigger member 24 is disposed in the handle portion and pivoted as by means of aforementioned fastener 22 therein. Main section 21a of the handle portion provides a flat guiding and supporting surface 25 (FIG. 5) for pivotal movement of the trigger member in the handle portion. Trigger member 24 includes an elongated curved leg portion 26 and a head portion 28. A U-shaped spring 30 coacting between the interior of handle section 21 and the trigger member 24 may serve to urge the head portion 28 of the trigger member outwardly through opening 32 in the handle section 21. If the valve member 14 is of sufficient weight (for instance if formed of metal or some other suitable relatively heavy material) the spring 30 might be eliminated, and the force of gravity along used to close valve 14.

Movably attached as at 34 to head portion 28 of the trigger is an elongated rod or stem 36. Attached to rod 36 is aforementioned valve member 14 which is adapted to coact in sealing relation with the opening 16 communicating duct 12 with storage section 10.

Figure 7:
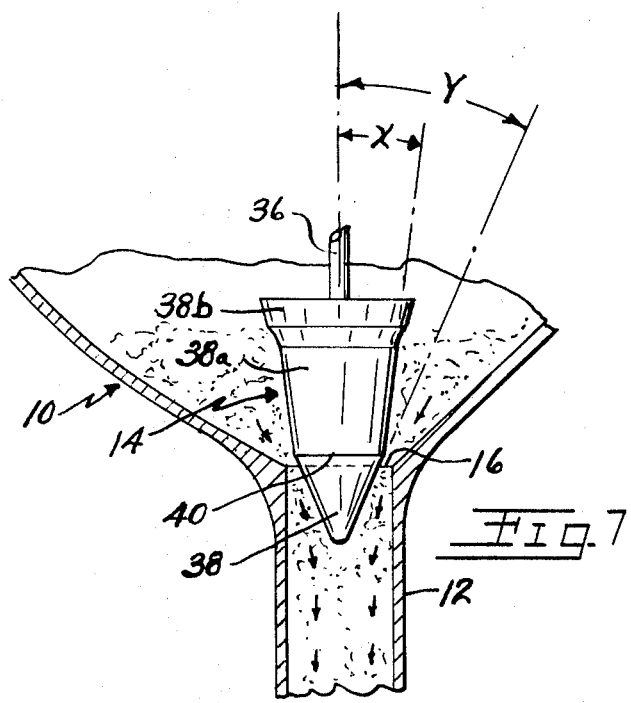
FIG. 7 is an enlarged, fragmentary, sectional view illustrating the valve mechanism in a raised condition, for discharge of material from the distributing mechanism.

Valve 14 is of generally invented conical or projectilelike configuration, comprising a relatively sharply tapered nose section 38, a lesser tapered central portion 38a which actually engages the defining periphery of opening 16 and prevents the flow of material from the storage section 10 into the discharge tube 12, and an end portion 38b of widened diameter as compared to portions 38 and 38a. As can be readily seen, the valve is of a size that prevents its passage entirely through the opening 16. Upon retraction of the trigger head portion 28 against the resistance wither of gravity and/or of compression spring 30, rod 36 is moved vertically thereby lifting the valve member 14 out of coaction with the periphery of opening 16, therefore opening the storage section 10 to communication with discharge duct 12. Valve member 14 may be of such weight that upon release of the trigger member 24, gravitational force will move the valve member to closed position, or alternately, spring 30 acting in conjunction with gravity, will move the valve member 14 toward closed position. The angle X (FIG. 7) of taper of the central portion 38a is such that there is a relatively low rate of opening area change during the first portion of the upward opening movement of valve member 14. After passage of circumferential boundary line or area 40 of the valve member upwardly past the perimeter of opening 16, the angle Y (FIG. 7) of taper of the nose portion 38 causes the rate of opening area change to increase rapidly. The relationship is preferably such that during approximately the first half of opening movement of valve 14, the rate of change of the opening area communicating storage section 10 with duct 12 is relatively low while during the last half of the valve's movement the rate of area change increases comparatively rapidly.

The widened end portion 38b of the valve member aids in breaking up any caking that has occurred of the material being distributed, thereby maintaining the flow of material past the valve into the dispensing duct 12. The tapered defining surfaces of the valve member likewise aid in the flow of the material whether it be granular or liquid, through opening 16 and into the dispensing duct.

The storage section 10 may have liquid level markings 44 (FIG. 1) located on the sides of the hopper. These may be used in obtaining the proper mixture of concentrated liquid weed killer, fertilizer or other chemical, and water.

In order to provide for controlling the extent of inward movement of the trigger member 24 with respect to the handle portion and thus vary the amount of opening of the valve member 14, there may be provided an adjustable abutment means 46 mounted on the neck portion 18, and which extends into the handle section 21 through opening 48 therein. Member 46 is adapted for abutting coaction with the trigger member 24 to limit the upward or inward movement of the trigger. Member 46 has an elongated slot 50 therein through which extends aforementioned fastener 22a which may include a winged nut 52 for coacting in pressure applying relation to the handle section 21 thus urging the latter against abutment member 46 to hold member 46 in predetermined position with respect to the trigger. The abutment member 46 may include a pointer 54 which is adapted to coact with marking indicia 56 on the neck portion of the distributing mechanism, for indicating the extent through which the trigger member may be moved (and thus the extent to which the valve member 14 will be opened) as determined by the position of the abutment member 46. Thus, it will be seen that upon loosening of nut 52 and moving the abutment member 46 closer to the head portion 28 of the trigger member, the pointer 54 will indicate that a lesser amount of material will be released from the hopper of the storage section when the trigger is depressed or moved inwardly its maximum permissible amount. Movement of member 46 toward the trigger to a position wherein the pointer 54 is at O will, in the embodiment illustrated, lock the trigger in the position shown in FIG. 6 and prevent any opening of valve 14. Neck 18 may be notched or recessed as at 58 (FIGS. 4 and 5) to provide clearance for rod 36 during upward movement thereof with trigger 24.

Operation of the mechanism it is believed will be obvious, but briefly the material to be distributed wither in granular, powdered or liquid form is poured into the hopper to the desired level, and the distributing tube 12 is directed to the point to which the material is desired to be applied. The operator then squeezes the trigger and the material is discharged from the hopper into the tube and directed by the tube to the desired point of application. The overall height of the device is preferably such that it can be operated from a standing position without the necessity of any bending at the waist by the operator to direct the material to the desired point of application. The extent of inward movement of the trigger is limited by the abutment member 46 which as aforedescribed is adjustable. Release of the trigger will cause the valve member to move due either to the force of gravity, or to the latter in conjunction with a spring means (e.g., 30) if the latter is used, toward closed position, thus cutting off the flow of material from the hopper. Due to the different stages of tapering of the valve member, upon initial opening movement of the valve member relatively little material will flow through the opening 16 and into the discharge duct 12. However, as the valve member is further opened due to depression of the trigger a greater amount, more material flows past valve 14 and through opening 16.

Figure 8:
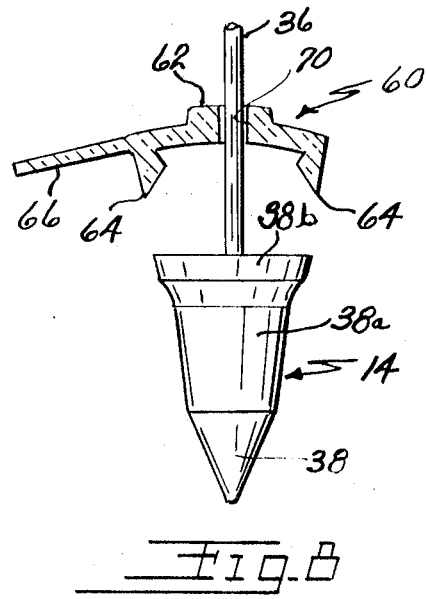
FIG. 8 is an enlarged, fragmentary, side elevation showing in section an agitator clip which is adapted to be assembled with the valve of the distributing mechanism when utilizing fine granular or powdered material in the mechanism, for aiding in preventing caking from occurring at the valve location.
Figure 10:
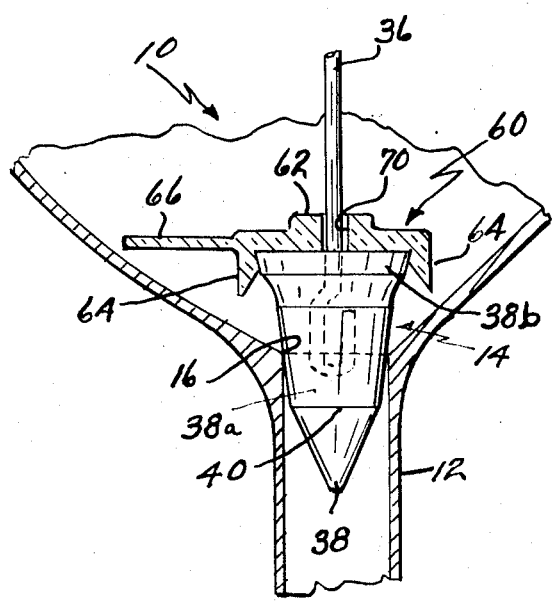
FIG. 10 is a side elevational view of the agitator mechanism as assembled on the valve taken generally along the plane of line 10–10 of FIG. 9 looking in the direction of the arrows.
Figure 9:
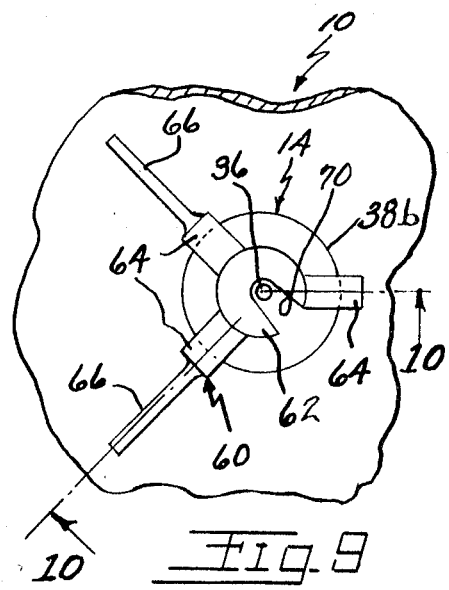
FIG. 9 is a top plan view of the agitator mechanism as assembled on the valve.

Referring to FIGS. 8 through 10, there is shown a modified form wherein an agitator member 60 is detachably attached to the valve member, for aiding in braking up any caking of the material during operation of the distributing mechanism. Such agitator member comprises a body portion 62 which has clip means 64 formed thereon which are adapted to snap into gripping coaction with the rearward or upper end portion 38b of the valve member, and thus hold the agitator member in predetermined position. Elongated arms 66 project generally horizontally outwardly from the body portion with such fingers or arms providing a wide range of breaking force for breaking up caked material during vertical movement of the valve member. As can be best seen in FIG. 8, the agitator member is initially formed generally concave so as to help to urge the gripping portions 64 into holding coaction with the valve member, Since the hopper is of a greater extent in its rearward direction then in its forward direction, the arms or fingers 66 extending outwardly from the body portion 62 are directed into the rearward portion of the hopper. As shown in FIG. 9, the body portion, by means of the elongated slot 70 therein, enables the agitator member to be assembled with the valve member when the valve member is attached to rod 36. Agitator 60 may be formed of any suitable material, but may conveniently be formed of somewhat resilient plastic material. In fact, the greater portion of the distributing mechanism could be expeditiously formed of preferably high strength plastic.

From the aforegoing description and accompanying drawings it will be seen that the invention provides a novel material dispensing device for use as for instance as a multipurpose garden gun, comprising a storage or hopper section adapted for storing a quantity of material therein, such as for instance fertilizer or the like, and with an elongated dispensing spout or tube communicating with and extending from the storage section, and with valve means coacting between the storage section and the dispensing spout for controlling the discharge of material from the hopper into the spout, together with means for expeditiously controlling the valve means.

The terms and expressions which have been used are used as terms of description and not limitation, and there is no intention in the use of such terms and expressions to exclude any of the features shown or described, or portions thereof, and it is recognized that various modifications are possible within the scope of the invention as defined.

What I claim is:

1. In an elongated device for dispensing material, such as for instance fertilizer and the like, from a generally upright position, comprising, a storage section defining an enlarged hopper for receiving dispensable material therein, a dispensing duct of relatively narrow cross section extending from the bottom of said hopper, the latter having an opening in said bottom thereof for communicating said hopper with said duct and an entry way in the top thereof for filling the hopper with material, said duct being of a greater height than the height of said hopper, with said hopper being disposed generally adjacent the upper end of said device on opposite sides of the vertical center plane of said device and offset laterally with respect to the vertical axis of said duct, a hollow neck portion projecting upwardly from said hopper on opposite sides of said vertical center plane of said device, a handle portion secured to said neck portion and extending laterally therefrom along said vertical center plane of said device and in a direction to overlie said offset hopper, said handle portion including a gripping section disposed in overlying relation to said hopper, valve means for controlling the flow of material from said hopper into said duct for directing the dispensable material from said device to a selected location, said valve means including a valve member coacting with said opening for closing and opening the latter, and a stem connected to said valve member and extending upwardly into said hollow neck portion, pivotal trigger means on said handle portion, said trigger means being operatively coupled to said stem for opening said valve member upon upward pivotal movement of said trigger means, said valve member being adapted to close said opening upon release of said trigger means and resultant downward pivotal movement thereof.

2. A device in accordance with claim 1 wherein said valve member is of generally conical-shaped configuration and includes a relatively sharply tapered lower nose section, and a lesser tapered intermediate section, and a widened upper end section, said intermediate section coacting with said opening so as to initially provide for a relatively low rate of opening area change during initial opening movement of said valve means, and then providing a much faster rate of change when said nose section is raised into said opening.

3. A device in accordance with claim 1 including adjustable means for variably limiting the maximum extent of opening movement of said valve means.

4. A device in accordance with claim 1 wherein said trigger means on said handle portion comprises an elongated trigger pivoted at one end thereof to said handle portion and movably coupled adjacent the other end thereof to said stem, and said valve means is actuated to closing position by gravity.

5. A device in accordance with claim 1 wherein said handle portion is hollow, said trigger means on said handle portion comprises an elongated trigger member pivoted adjacent one end thereof to said handle portion and movably coupled adjacent the other end thereof to said stem, and including spring means coacting with said trigger means for urging said valve means to closing position, said handle portion being of a pistol grip type.

6. A device in accordance with claim 1 wherein said trigger means comprises an elongated member pivoted adjacent one end thereof to said handle portion and having a head portion extending through an opening in said handle portion, said head portion being adapted for actuation by the finger of an operator's hand gripping said handle portion.

7. A device in accordance with claim 6 including spring means coacting with said trigger means and urging said head portion of said trigger means outwardly of the last-mentioned opening.

8. A device in accordance with claim 1 wherein said handle portion comprises a main generally vertically oriented section secured to said neck portion and a separable generally vertically oriented section detachably secured to said main section, one of said handle sections providing a substantially flat vertically extending guide surface disposed in confronting relation to the other of said handle sections, said other handle section having a recess therein, and said trigger means being movably mounted in said recess of said other section and guided for movement by said guide surface, said trigger means being of elongated configuration and pivoted adjacent one end thereof to said handle portion and movably connected at the other end thereof to said stem of said valve means.

9. A device in accordance with claim 1 wherein said trigger means on the handle portion for operating the valve means comprises an elongated pivotal trigger member, and adjustable stop means for selectively limiting the maximum pivotal movement of said trigger member.

10. A device in accordance with claim 9 wherein the means for limiting the movement of maximum trigger member comprises an abutment, means adjustably mounting the abutment on said device, and pointer means on said abutment and indicia on said device adapted for coaction for identifying the amount of permissible movement of said trigger member in a selected position of said abutment.

11. A device in accordance with claim 10 including means on said handle portion for guiding the movement of said abutment upon adjustment thereof, and releasable means coacting with said handle portion and said abutment for locking the abutment in selected position with respect to said trigger member.

12. A device in accordance with claim 1 including detachable agitator means coacting with said valve means for breaking up caked material in said storage section during movement of said valve means, 13. A device in accordance with claim 12 wherein said agitator means comprises generally horizontally extending spaced fingers, and means for detachably clipping said fingers to said valve means.

14. A device in accordance with claim 1 wherein said device is of such overall height that said handle portion is disposed at a level approximately the level of the hands of a user in the standing position of the latter when the discharge end of said duct is at approximately ground level.